United States Patent [19]

Lingl, Jr. et al.

[11] 4,144,977
[45] Mar. 20, 1979

[54] SELECTIVE EDGE OR FLAT SETTING OF BRICK

[75] Inventors: Hans Lingl, Jr.; Manfred A. Kollmann, both of Paris, Tenn.

[73] Assignee: Lingl Corporation, Paris, Tenn.

[21] Appl. No.: 918,346

[22] Filed: Jun. 23, 1978

Related U.S. Application Data

[63] Continuation of Ser. No. 752,917, Dec. 21, 1976, abandoned.

[51] Int. Cl.² ............................................. B65G 57/26
[52] U.S. Cl. ..................................... 414/57; 198/373
[58] Field of Search ............... 214/6 A, 6 P; 198/374, 198/411, 412, 413; 264/57, 58

[56] References Cited

U.S. PATENT DOCUMENTS

| 3,480,161 | 11/1969 | Bason | 214/6 A |
|---|---|---|---|
| 3,917,081 | 11/1975 | Pearne et al. | 214/6 A |
| 3,951,275 | 4/1976 | Gagnon et al. | 214/6 A |
| 4,014,441 | 3/1977 | Osborn et al. | 214/6 A |

FOREIGN PATENT DOCUMENTS 1056029  4/1959  Fed. Rep. of Germany.
1931878  9/1971  Fed. Rep. of Germany.

*Primary Examiner*—Francis S. Husar
*Assistant Examiner*—Ross Weaver
*Attorney, Agent, or Firm*—Cushman, Darby & Cushman

[57] ABSTRACT

Bricks (or other block-like articles) are automatically selectively set either "edgewise" or "flatwise" onto a platform such as a kiln car. The operational mode can be conveniently and automatically programmed to change from edge setting to flat setting and vice versa so that, for example, a hack of uncured bricks can be formed of flats (layers) alternating between edge and flat set as may be desired for subsequent curing operations in a kiln. In the flat setting mode, groups of bricks are turned by 90° before they are grouped and transferred as a layer of "flat" oriented bricks for hacking. In the edge setting mode, such bricks are grouped and transferred as a layer of "edge" oriented bricks onto a hack. Special techniques are employed to facilitate changes between these two modes of operation.

43 Claims, 3 Drawing Figures

SELECTIVE EDGE OR FLAT SETTING OF BRICK

This is a continuation, of application Ser. No. 752,917 filed Dec. 21, 1976, now abandoned.

This invention relates generally to brick-making method and/or apparatus. In particular, it involves the handling of brick or other block-like articles so as to form flats or layers for stacking one on top of the other in a so-called "hack." The preferred embodiment relates to the handling of "green" or uncured brick after extrusion and cutting operations and stacking such bricks in a hack onto a kiln car for subsequent curing operations as will be understood. Hereinafter the term "brick" is intended to include brick-like or block-like articles initially formed from clay mixtures or the like and then hardened by firing in a kiln or the like.

After extrusion and cutting operations, the newly-formed and uncured brick are normally conveyed on belts or the like in "edgewise" fashion — i.e., resting on one of the long narrow brick faces. Known machinery and methods exist for forming flats of spaced-apart edge set bricks and automatically stacking same into hacks on kiln cars for subsequent firing.

There are also known techniques for rotating brick or block-like articles by 90° on a conveyor mechanism and thereafter conveying same in a "flatwise" fashion — i.e., resting on one of the long wide brick faces. Thereafter, known machinery and methods can be used for automatically forming flats of spaced-apart flat set bricks and stacking same onto hacks on kiln cars for subsequent firing.

However, in the past, brick setting machines have not been capable of changing from edge setting to flat setting and vice versa during the ongoing operation of the machine so as to permit the formation of hacks having interspersed flats of both edge set and flat set bricks as desired. Since there are advantages to be had in forming such hacks, this invention is directed to a unitary apparatus and/or method for conveniently changing between the edge and flat setting modes of operation. Such changes can be achieved automatically under programmed control to achieve any desired mixture of edge and flat setting in a brick hack.

Since the newly-extruded and cut bricks are normally presented in edgewise orientation, edge setting is achieved by conveying, grouping and transferring operations which leave the bricks in edgewise position within the layers or flats formed for stacking into a hack. However, one of the conveyors involved in such operation includes means for temporarily preventing bricks thereon from further conveyance during changes in operational modes so as to clear a selected downstream site of bricks and thus permit the engagement or disengagement of a tilting mechanism from the operational sequence at that selected downstream site. When such tilting mechanism is disengaged, edge setting will result. When such tilting mechanism is engaged, successive groups of edgewise oriented bricks are rotated about a horizontal axis by 90° so as to result in flat setting downstream for formation of a flat set layer.

A more complete understanding of the invention, its objectives and its preferred modes of operation may be had from the following detailed description taken in conjunction with the drawings, of which:

Figure 1:
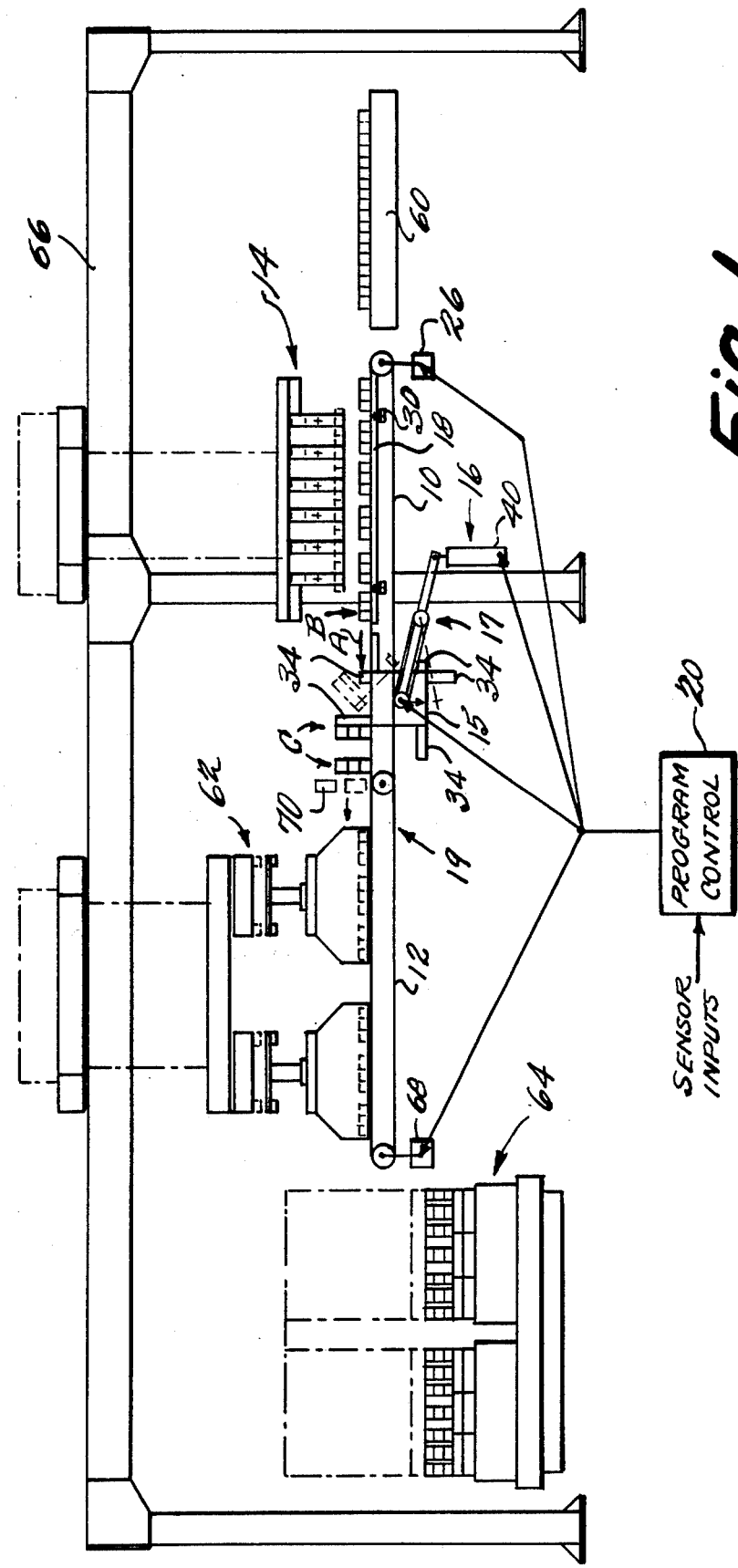
FIG. 1 is a schematic side view of exemplary presently preferred apparatus according to the present invention.

Apparatus according to a presently preferred embodiment of the invention is shown schematically in FIG. 1 and includes a first conveyor 10 of multiple parallel belts for transporting bricks horizontally along direction A and transfer gripper means 14 for transferring bricks onto conveyor 10 with spacing as desired between individual bricks or groups of bricks as shown. A star wheel 15 having a plurality of fingers 34 interleaved with the multiple belts of conveyor 10 is also provided as is suitable means 16 for vertically moving the star wheel from an operative position (FIG. 1) wherein brick-engaging finger portions 34 thereof protrude at or above the transporting surface of conveyor 10 to an inoperative position (FIG. 2) wherein brick-engaging portions 34 thereof are below and out of operative association with the transporting surface of conveyor 10. This embodiment also includes means 17 for rotating star wheel 15 by successive increments of 90° about a horizontal axis upon sensing the loading of bricks into a brick-engaging finger portions 34 thereof for tilting one or more bricks to a flat setting position (as shown at C) having a substantially 90° orientation with respect to the first edge setting position (as shown at B). There is also provided a means 18 upstream of the star wheel 15 for lifting bricks out of engagement with conveyor 10 during movement of star wheel 15 from its operative position (FIG. 1) to its operative position (FIG. 2) and vice versa.

Finally, means 19 is provided for grouping bricks downstream of the star wheel 15 into layers or flats, the grouping means 19 preferably comprising a second conveyor 12 and programmed control means 20 for controlling the operation and/or speed of the second conveyor 12 with respect to the first conveyor 10 such as to achieve selective spacing of bricks along the second conveyor 12. Other conventional gripper apparatus 62 is provided to transfer the grouped flats of either edge or flat set bricks onto kiln car hacks at 64.

The first conveyor 10 preferably comprises a plurality of spaced conveyor belts or chains, each of the belts having transporting surfaces at the upper or top side as will be appreciated. A power source 26 is provided for movement of the conveyor belts 10 so as to advance bricks in direction A under programmed control of controller 20. The individual belts of conveyor 10 may comprise plastic top chains or other narrow conveyors.

The means 18 for lifting bricks upstream of star wheel 15 out of engagement with the first conveyor 10 preferably comprises a grid or plurality of elongated members interspersed between the belts of conveyor 10 and capable of being raised vertically by pneumatic cylinders 30 from a position above the transporting surfaces of the conveyor 10 to a position below the transporting surfaces of conveyor 10 and vice versa.

The star wheel 15 preferably comprises a plurality of tilting stars, each tilting star having perpendicularly disposed brick-engaging finger portions 34 thereof (four such arrangements 36 being provided for each star), the individual brick-engaging finger portions 34 being interspersed with the spaced conveyor belts 10. Means 16 for vertically moving the finger portions 34 from a position at or slightly above the top of conveyor belts 10 to a position therebelow preferably comprises pneumatic cylinders 40, and a lever arm 42, having a pivot point 44. Each star is pivoted about horizontal pivot shaft and the means 17 for rotating the stars comprises a belt drive 48 and a power source 50. Conventional indexing controls are utilized for insuring that such drive only causes a 90° rotation of the star wheels for each initiation of movement caused by controller 20.

Figure 2:
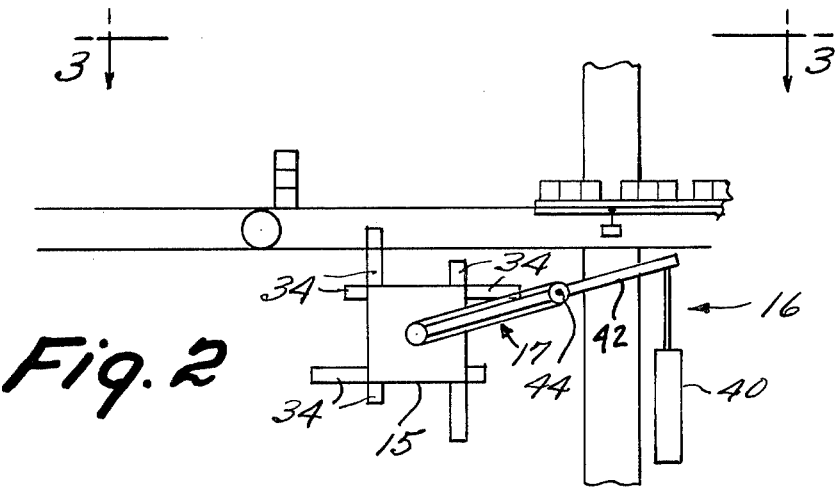
FIG. 2 is an enlarged schematic of a portion of the apparatus of FIG. 1 showing the tilting star in a non-operative position thereof.
Figure 3:
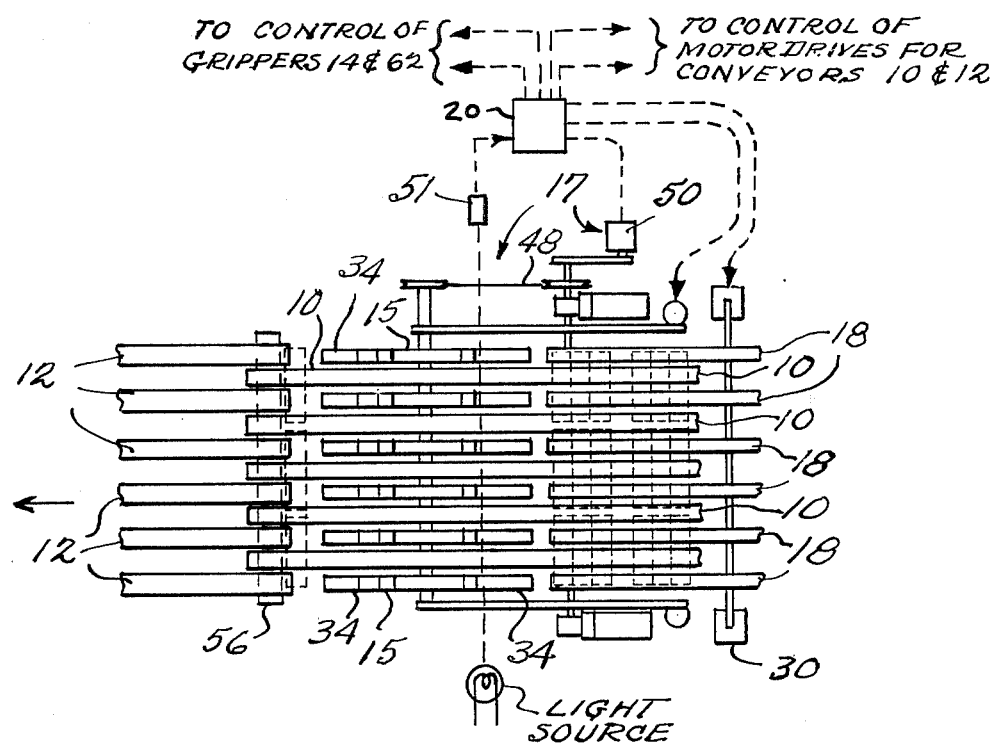
FIG. 3 is a top view, taken along lines 3—3 of FIG. 2, showing the apparatus of FIG. 2.

Such structure is shown most clearly in FIGS. 2 and 3. The withdrawal of the piston rod into cylinder 40 resulting in upward movement of the tilting stars 15 about pivot point 44 into operative association with bricks on conveyor 10 (see FIG. 1), and the extension of the piston rod out of cylinder 40 resulting in movement of the tilting stars 15 into inoperative position (see FIG. 2).

Upon command from the controller 20, the power source 50 is actuated to incrementally rotate finger star wheels 15 by 90°. Such 90° rotation tilts the bricks already loaded onto fingers 36 into flat set position downstream on conveyor 10 at C and, at the same time, positions the next set of fingers 36 into loading position. A photocell assembly 51 or the like is provided to sense the movement of bricks into loading engagement with finger portions 34 and thereafter causes 90° rotation of star wheels 15.

The second conveyor 12 also preferably comprises a plurality of belts interspersed with the belts of conveyor 10 as shown in FIG. 3. Common coaxial shafts 56 may be provided to allow overlapping of the conveyors 10, 12, or two separate shafts may be provided as desired. In any event, provision is made so as to permit conveyors 10 and 12 to move independently of one another since the final spacing of bricks on conveyor 12 forming layers or flats for stacking purposes is achieved by controlling the relative speeds of conveyors 10 and 12 according to known techniques. See, for example, U.S. Pat. No. 3,625,375.

The means 14 for transferring the bricks into engagement with the first conveyor 10 preferably comprises a conventional transfer gripper having the capability to separate bricks being transferred thereby into groups during transport (introduce horizontal spacing between bricks). The bricks are initially disposed on a grouping table 60 adjacent to each other, and the transfer gripper vertically lifts the bricks, horizontally moves them into a position above the conveyor 10 (see FIG. 1) while automatically horizontally spacing the bricks, and then lowers the bricks into engagement with the grid 18 or directly into engagement with conveyor 10. Of course, it would also be possible to use other conventional means for spacing the bricks on conveyor table 60 and then transferring them in that condition to conveyor 10. Still another possibility is to simply transfer the bricks in abutting relationship to conveyor 10 for separation during subsequent processing steps as should be appreciated.

After proper grouping of the bricks into flats by controlling the relative speeds of the conveyors 10, 12, the brick flats are picked up by a conventional gripper lifting means 62 which has the capability of turning the brick flats 90° about a vertical axis as desired and stacking the brick flats in a hack on a kiln car as at 64. The bricks — when they are uncured bricks — are then transported to a kiln for firing. All of the apparatus preferably is supported by or under a common frame member 66, the means 14 and 62 being relatively movable along frame 66 while supported thereby as will be appreciated.

The programmed controller 20 selectively controls the relative speeds of the conveyors 10, 12, and the operations of the other moving mechanisms in a desired predetermined or programmed sequence as in conventional in the art. For example, the controller 20 is connected to the motor 68 for moving the second conveyor 12, and to the power source 26 for the first conveyor 10. Additionally, common control box 20 can also provide (see FIGS. 1 and 3) control for the power sources 30, 40 and 50 in response to photocell assembly 51 and other sensor inputs as is conventional for respective controlled operation of the grid 18, the vertical movement of the tilting stars 15, and the incremental 90° rotation of the tilting stars. Control of all of these power sources may be accomplished by any suitable conventional means such as an endless punched or magnetic tape control, with one tape length representing the running cycle from one flat of bricks to the next flat of bricks, or from one group of flats to the next group of flats whereby the bricks transferred from conveyor 10 to conveyor 12 stop in a controlled position immediately following the transfer point while conveyor 10 keeps running until the gap between the bricks has been closed to the desired spacing whereupon conveyor 12 is started again until the next brick group has reached the same controlled stopping position. This cycle continues until a complete layer or flat is formed whereupon conveyor 12 moves further to provide the desired space between flats.

Tilting stars 15 and grid 18 are also controlled by the same control system with an additional control such as a conventional step switch selecting different programs on the tape for flat or edge setting combinations, etc.

Preferably, the controller 20 operates to stop conveyor 10 during incremental 90° rotation of star wheel 15 and starts conveyor 10 again once an incremental 90° rotation has been completed. During changeover from one setting pattern (i.e., edge setting) to another setting pattern (i.e., flat setting) the controller 20 preferably operates to control means 30 so as to lift grid 18 and support bricks upstream of star wheel 15 above conveyor 10, while conveyor 10 runs to move all bricks downstream of star wheel 15 onto conveyor 12. Of course, the control is such that the bricks already past grid 18 will be sufficient in number to complete the layer or flat then being formed on conveyor 12. The star wheel is moved by cylinders 40 to either its operative or inoperative position after the downstream area has been cleared. This type of changeover procedure is especially desired when changing from edge to flat setting since the raising of the star wheel would otherwise encounter interference with any bricks that might still be at the tilting station location due to the preceding edge setting operation.

A gate 70 — as shown in FIG. 1 and as described in U.S. Pat. No. 3,625,375 — may be provided if desired for assisting in the proper spacing of bricks by relative control of conveyors 10, 12.

In operation of the present invention, bricks are grouped and set during continuous programmed operation. Bricks are transferred into engagement with conveyor 10, the bricks being disposed in a first orientation B. The bricks may be selectively programmed (a) for transport along direction A without change from orientation B on the conveyor 10 past a tilting station or, alternatively, (b) for transport along direction A with change from orientation B to a second orientation C tilted by substantially 90° about a horizontal axis with respect to the first orientation B at the tilting station. Such tilting is achieved by incremental 90° rotation of stars 15 about axis 46 upon the sensing by photocell 51 of bricks moving into engagement with finger portions 34, the operation of conveyor 10 being preferably arrested during the incremental 90° rotation. The edge or flat set groups of bricks thus produced on conveyor 10 are grouped into flats of bricks on conveyor 12 (by conventional relative control of conveyors 10 and 12) and thereafter gripped and stacked conventionally into hacks on kiln cars.

Changeover from edge setting to flat setting is effected during on-going operation by lifting bricks on conveyor 10 upstream of tilting station 15 off of the conveyor 10 while continuing operation of the conveyors 10 and 12 until all bricks downstream of the tilting station reach the grouping station (at conveyor 12) for completion of the layer or flat then being formed. Thereafter star wheels 15 are raised and operation resumed in the flat setting mode by lowering grid 18 and operating star wheels 15 and conveyors 10 and 12 in coordination as described. Similar automatic changeover operations apply for changing from flat to edge setting as should now be apparent.

It will be seen that according to the present invention a method and apparatus have been provided for providing quick changeover from flat setting pattern to another edge setting pattern, without interfering with the high operating speeds of the grouping operation. For instance, according to the method and apparatus of the present invention, over 20,000 bricks per hour may be grouped and set, either flat set, edge set, or mixed flat and edge set.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A method for grouping and setting bricks during a continuous machine operation, said method comprising:
    (a) transferring bricks disposed in a first orientation onto a transport mechanism for movement in a given horizontal direction,
    (b) transporting some of said bricks along said horizontal direction while maintaining said first orientation; and transporting other of said bricks along said horizontal direction while changing said bricks to a second orientation tilted by substantially 90° about a horizontal axis with respect to said first orientation, by rotating said others of said bricks 90° about a horizontal axis perpendicular to said horizontal direction of transport; said rotating of others of said bricks 90° about a horizontal axis being accomplished by a star wheel which engages one or more bricks disposed in said first orientation on the transport mechanism and places the engaged bricks back on the transport mechanism in said second orientation; and said transporting of some of said bricks along said horizontal direction while maintaining said first orientation being accomplished by movement of said star wheel from an operative position wherein it is in operative engagement with the transport mechanism to an inoperative position wherein it is below the transfer mechanism and out of operative association therewith,
    (c) arresting operation of the transport mechanism for movement of bricks in a given horizontal direction during rotation of the star wheel,
    (d) grouping of said bricks of either said first or second orientation into a layer of bricks having like orientation, and
    (e) stacking said brick layer of either said first or second orientation into a hack of brick having individual layers therein formed by repeating steps a, b, c, d, and e, the bricks in any given layer having either said first or second orientation as selectively controlled during step b of said continuous operation of grouping and setting.

2. The method of claim 1 wherein said transferring step comprises:
    gripping and lifting abutting bricks, spacing the lifted brick horizontally, depositing the spaced bricks onto a support, and
    subsequently transferring the spaced bricks onto a conveyor moving in said horizontal direction.

3. The method of claim 1 wherein said transporting step comprising temporarily halting the movement in a horizontal direction during the tilting operations.

4. The method of claim 1 including the step of temporarily disengaging a portion of said bricks from further movement in said horizontal direction when selectively changing modes of operation from said first brick orientation to said second brick orientation while said grouping step continues so as to clear bricks from the area where tilting can occur thereby facilitating the movement of tilting mechanism into operative position within such area.

5. The method of claim 1 wherein said grouping step comprises controlled transfer of bricks from a first conveyor to a second conveyor by controlling the relative operation and/or speeds of the two conveyors.

6. The method of claim 1 wherein said transferring step comprises horizontally spacing the bricks into groups and wherein said tilting step, when selectively performed, comprises the successive tilting of a whole such group of bricks together as a unit.

7. The method of claim 6 wherein said transporting step comprises temporarily halting said movement in a horizontal direction during the tilting operations.

8. The method of claim 7 including the step of temporarily disengaging a portion of said bricks from further movement in said horizontal direction when selectively changing modes of operation from said first brick orientation to said second brick orientation while said grouping step continues so as to clear the area where tilting can occur of bricks thereby facilitating the movement of tilting mechanism in such area into operative position.

9. The method of claim 6 including the step of temporarily disengaging a portion of said bricks from further movement in said horizontal direction when selectively changing modes of operation from said first brick orientation to said second brick orientation while said grouping step continues so as to clear the area where tilting can occur of bricks thereby facilitating the movement of tilting mechanism in such area into operative position.

10. The method of claim 3 including the step of temporarily disengaging a portion of said bricks from further movement in said horizontal direction when selectively changing modes of operation from said first brick orientation to said second brick orientation while said grouping step continues so as to clear the area where tilting can occur of bricks thereby facilitating the movement of tilting mechanism in such area into operative position.

11. A method for grouping and setting bricks during a continuous operation utilizing a conveyor, said method comprising the steps of
  (a) transferring bricks into engagement with the conveyor, said bricks being disposed in a first orientation,
  (b) transporting some of said bricks in said first orientation by the conveyor in a given horizontal direction past a tilting station,
  (c) effecting tilting of others of said bricks from said first orientation to a second orientation rotated substantially 90° with respect to said first orientation at the tilting station during transport in the given horizontal direction by rotating said others of said bricks 90° about a horizontal axis perpendicular to said horizontal direction of transport,
  (d) changing over from step b to step c and from step c back to step b during ongoing operation by lifting bricks that are on the conveyor upstream of the tilting station off the conveyor while continuing operation of the conveyor until bricks downstream of the tilting station clear the tilting station, and
  (e) grouping said bricks at a grouping station downstream of the tilting station to form said bricks into flats of bricks, all bricks in each flat being either in said first or said second orientation.

12. A method as recited in claim 11 wherein the bricks are uncured bricks, and comprising the further steps of transporting the flats of bricks to a kiln car for subsequent curing thereof.

13. A method as recited in claim 11 wherein said step of tilting of bricks from said first to said second orientation is accomplished by a star wheel which engages one or more bricks disposed in said first orientation on the conveyor and then rotates 90° about a horizontal axis and places the engaged bricks back on the conveyor in said second orientation, operation of the conveyor being arrested during rotation of the star wheel.

14. A method as recited in claim 13 wherein changeover from step b to step c is accomplished by vertically moving the star wheel from an inoperative position wherein it is below the conveyor and out of operative association therewith to an operative position wherein it is in operative association with the conveyor.

15. A method as recited in claim 13 wherein changeover from step c to step b is accomplished by vertically moving the star wheel from an operative position wherein it is in operative engagement with the conveyor to an inoperative position wherein it is below the conveyor and out of operative association therewith.

16. A method as recited in claim 11 wherein the conveyor is a first conveyor and wherein a second conveyor is provided at the grouping station wherein grouping of said bricks is accomplished by controlling the operation and/or speed of the second conveyor with respect to the first conveyor for selective spacing of the groups of bricks into flats along the second conveyor.

17. A method for setting flats of tilted or untilted bricks comprising:
  supplying bricks from a first conveyor into position for transfer,
  transferring said bricks with a transfer gripper onto a second conveyor having a grid interspersed therewith for receiving the transferred bricks and holding same off the second conveyor until the grid is subsequently lowered,
  selectively raising a tilting star downstream of the grid when tilted brick setting is desired so as to engage the bricks moving on the second conveyor and tilt same,
  passing the selectively tilted or untilted bricks onto a third conveyor and controlling the relative speeds of the second and third conveyors so as to form flats with varying spacing as required by the setting patterns of tilted or untilted bricks, and
  transferring the flats of bricks so formed onto a setting platform such as a kiln car by a rotating setting gripper.

18. Apparatus for grouping and setting bricks during a continuous machine operation, said apparatus comprising:
  means for transferring bricks disposed in a first orientation onto a transport mechanism for movement in a given horizontal direction,
  means for transporting some of said bricks along said horizontal direction while maintaining said first orientation; and transporting others of said bricks along said horizontal direction while changing said bricks to a second orientation tilted by substantially 90° about a horizontal axis with respect to said first orientation, by rotating said others of said bricks 90° about a horizontal axis perpendicular to said horizontal direction of transport; said transporting means including a conveyor; a star wheel which engages one or more bricks disposed in said first orientation on said conveyor; and means for vertically moving said star wheel between an operative position wherein the brick-engaging portions thereof are at operative height with respect to the transporting surface of said conveyor, and an inoperative portion wherein brick-engaging portions thereof are below and out of operative association with the transporting surface of said conveyor,
  means for arresting operation of said conveyor during rotation of said star wheel,
  means for grouping said bricks of either said first or second orientation into a layer of bricks having like orientation, and
  means for stacking said brick layers of either said first or second orientation into a hack of bricks having individual layers of either said first or second orientation as selectively controlled by said means for selectively transporting during a continuous operation of grouping and setting.

19. Apparatus as in claim 18 including means for temporarily halting the transport movement in the horizontal direction during tilting operations.

20. Apparatus as in claim 18 including means for temporarily disengaging a portion of said bricks from further movement in said horizontal direction when selectively changing modes of operation from said first brick orientation to said second brick orientation while the grouping means continues to operate so as to clear bricks from the area where tilting can occur thereby facilitating the operative engagement of the tilting means into such area.

21. Apparatus as in claim 20 including means for temporarily halting the transport movement in the horizontal direction during tilting operations.

22. An assembly for grouping bricks during a continuous operation into flats selectively having bricks in any given flat of first or second relative orientations, said assembly comprising:
(a) a conveyor having a transporting surface,
(b) means for transferring bricks into engagement with said conveyor, said bricks being disposed in a first orientation,
(c) a star wheel having brick-engaging portions located thereon,
(d) means for vertically moving said star wheel between an operative position wherein the brick-engaging portions thereof are at operative height with respect to the transporting surface of said conveyor and an inoperative position wherein brick-engaging portions thereof are below and out of operative association with the transporting surface of said conveyor,
(e) means for incrementally rotating said star wheel 90° about a horizontal axis upon sensing of movement of bricks into operative association with the brick-engaging portions thereof, for tilting bricks in engagement with said star wheel to a second orientation rotated substantially 90° with respect to said first orientation,
(f) means for lifting bricks upstream of said star wheel out of engagement with said conveyor transporting surface at least during movement of said star wheel from said inoperative to said operative positions thereof, and
(g) means for grouping bricks downstream of said star wheel into flats.

23. An assembly as recited in claim 22 wherein said conveyor comprises a first conveyor having a plurality of parallel conveyor portions spaced from each other in a direction generally perpendicular to the direction of transport of bricks by said conveyor, each conveyor portion having a transporting surface.

24. An assembly as recited in claim 23 wherein said means for lifting bricks upstream of said star wheel out of engagement with said conveyor comprises a grid means having grid brick-supporting portions interspersed in the spaces between said spaced conveyor portions, and means for vertically moving said grid means from a position wherein said brick-supporting portions are above the transporting surfaces of said conveyor portions to a position wherein said brick-supporting portions are at or below the transporting surfaces of said conveyor portions.

25. An assembly as recited in claim 23 wherein said star wheel comprises a plurality of tilting stars each having generally perpendicularly disposed brick-engaging portions thereof disposed in the spaces between said spaced conveyor portions.

26. An assembly as recited in claim 23 wherein said means for grouping bricks into flats downstream of said star wheel comprises a second conveyor and means for controlling the operation and/or speed of said second conveyor with respect to said first conveyor for selective spacing of bricks along said second conveyor.

27. An assembly as recited in claim 26 wherein said second conveyor comprises a plurality of conveyor portions spaced from each other in a direction generally perpendicular to the direction of transport of bricks by said second conveyor, and wherein said first and second conveyors overlap each other, conveyor portions of one of said first and second conveyors being disposed in the spaces between the spaced conveyor portions of the other of said first and second conveyors.

28. An assembly as recited in claim 26 further comprising means for transporting flats of bricks from said second conveyor to a kiln car and for positioning successive flats on said kiln car in selective angular orientations with respect to each other.

29. An assembly as recited in claim 22 further comprising a grouping table for grouping bricks adjacent each other before transport to said conveyor, and wherein said brick transferring means comprises means for lifting bricks from said grouping table and horizontally moving said bricks to a position above said conveyor, and for automatically horizontally spacing the bricks during transport thereof.

30. An assembly as in claim 24 wherein said star wheel comprises a plurality of tilting stars each having generally perpendicularly disposed brick-engaging portions thereof disposed in the spaces between said spaced conveyor portions.

31. An assembly as in claim 30 wherein said means for grouping bricks into flats downstream of said star wheel comprises a second conveyor and means for controlling the operation and/or speed of said second conveyor with respect to said first conveyor for selective spacing of bricks along said second conveyor.

32. An assembly as in claim 31 wherein said second conveyor comprises a plurality of conveyor portions spaced from each other in a direction generally perpendicular to the direction of transport of bricks by said second conveyor, and wherein said first and second conveyors overlap each other, conveyor portions of one of said first and second conveyors being disposed in the spaces between the spaced conveyor portions of the other of said first and second conveyors.

33. An assembly as in claim 32 further comprising means for transporting flats of bricks from said second conveyor to a kiln car and for positioning successive flats on said kiln car in selective angular orientations with respect to each other.

34. An assembly as in claim 33 further comprising a grouping table for grouping bricks adjacent each other before transport to said conveyor, and wherein said brick transferring means comprises means for lifting bricks from said grouping table and horizontally moving said bricks to a position above said conveyor, and for automatically horizontally spacing the bricks during transport thereof.

35. A method for grouping and setting bricks during a continuous operation utilizing a conveyor, said method comprising the steps of
(a) transferring bricks into engagement with the conveyor, said bricks being disposed in a first orientation,
(b) transporting some of said bricks in said first orientation by the conveyor in a given horizontal direction past a tilting station,
(c) effecting tilting of others of said bricks from said first orientation to a second orientation rotated substantially 90° with respect to said first orientation at the tilting station during transport in the given horizontal direction, said tilting being accomplished by a star wheel which engages one or more bricks disposed in said first orientation on the conveyor and then rotates 90° about a horizontal axis and places the engaged bricks back on the conveyor in said second orientation, operation of the conveyor being arrested during rotation of the star wheel, (d) changing over from step b to step c and from step c back to step b during ongoing operation by lifting bricks that are on the conveyor upstream of the tilting station off the conveyor while continuing operation of the conveyor until bricks downstream of the tilting station clear the tilting station, and (e) grouping said bricks at a grouping station downstream of the tilting station to form said bricks into flats of bricks, all bricks in each flat being either in said first or said second orientation.

36. A method for grouping and setting bricks during a continuous operation utilizing a conveyor, said method comprising the steps of (a) transferring bricks into engagement with the conveyor, said bricks being disposed in a first orientation, said transferring being accomplished by lifting bricks that are in abutting engagement on a grouping table off the grouping table, introducing horizontal spacing between the bricks as they are transferred from the grouping table toward the conveyor, and lowering the bricks into operative association with the conveyor by lowering them into engagement with a grid having brick-supporting portions spacing bricks from the conveyor, and vertically moving the grid to bring the bricks on the grid into engagement with the conveyor, (b) transporting some of said bricks in said first orientation by the conveyor in a given horizontal direction past a tilting station, (c) effecting tilting of others of said bricks from said first orientation to a second orientation rotated substantially 90° with respect to said first orientation at the tilting station during transport in the given horizontal direction, (d) changing over from step b to step c and from step c back to step b during ongoing operation by lifting bricks that are on the conveyor upstream of the tilting station off the conveyor while continuing operation of the conveyor until bricks downstream of the tilting station clear the tilting station, and (e) grouping said bricks at a grouping station downstream of the tilting station to form said bricks into flats of bricks, all bricks in each flat being either in said first or said second orientation.

37. A method as recited in claim 1 wherein said stacking step is accomplished by providing at least one layer in said hack of bricks with said first orientation, and at least one layer in said hack of bricks with said second orientation.

38. A method for grouping and setting bricks during a continuous machine operation, said method comprising:

(a) transferring bricks disposed in a first orientation onto a transport mechanism for movement in a given horizontal direction, (b) transporting some of said bricks along said horizontal direction while maintaining said first orientation; and transporting others of said bricks along said horizontal direction while changing said bricks to a second orientation tilted by substantially 90° about a horizontal axis with respect to said first orientation, by rotating said others of said bricks 90° about a horizontal axis perpendicular to said horizontal direction of transport, (c) grouping said bricks of either said first or second orientation into a layer of bricks having like orientation, (d) temporarily disengaging a portion of said bricks from further movement in said given horizontal direction when selectively changing modes of operation from said first brick orientation to said second brick orientation while said grouping step continues so as to clear bricks from the area where tilting can occur thereby facilitating the movement of tilting mechanism into operative position within such area, and (e) stacking said brick layer of either said first or second orientation into a hack of brick having individual layers therein formed by repeating steps a, b, c and d, the bricks in any given layer having either said first or second orientation as selectively controlled during step b of said continuous operation of grouping and setting.

39. The method of claim 38 wherein said transporting step comprises temporarily halting said movement in a horizontal direction during the tilting operations.

40. The method of claim 38 wherein said transferring step comprises horizontally spacing the bricks into groups and wherein said tilting step, when selectively performed, comprises the successive tilting of a whole such group of bricks together as a unit.

41. The method of claim 40 wherein said transporting step comprises temporarily halting said movement in a horizontal direction during the tilting operations.

42. Apparatus for grouping and setting bricks during a continuous machine operation, said apparatus comprising:

means for transferring bricks disposed in a first orientation onto a transport mechanism for movement in a given horizontal direction, means for transporting some of said bricks along said horizontal direction while maintaining said first orientation; and transporting others of said bricks along said horizontal direction while changing said bricks to a second orientation tilted by substantially 90° about a horizontal axis with respect to said first orientation, by rotating said others of said bricks 90° about a horizontal axis perpendicular to said horizontal direction of transport, means for grouping said bricks of either said first or second orientation into a layer of bricks having like orientation, means for temporarily disengaging a portion of said bricks from further movement in said horizontal direction when selectively changing modes of operation from said first brick orientation to said second brick orientation while the grouping means continues to operate so as to clear bricks from the area where tilting can occur thereby facilitating the operative engagement of the tilting means into such area, and means for stacking said brick layers of either said first or second orientation into a hack of bricks having individual layers of either said first or second orientation as selectively controlled by said means for selectively transporting during a continuous operation of grouping and setting.

43. Apparatus as in claim 42 including means for temporarily halting the transport movement in the horizontal direction during tilting operations.

* * * * *